United States Patent [19]

Nishino et al.

[11] Patent Number: 5,295,068

[45] Date of Patent: Mar. 15, 1994

[54] APPARATUS FOR REGISTERING PRIVATE-USE WORDS IN MACHINE-TRANSLATION/ELECTRONIC-MAIL SYSTEM

[75] Inventors: Fumihito Nishino, Tokyo; Jun Ibuki, Kawasaki; Naohito Nakamura, Yokohama; Masatoshi Shiouchi, Kawasaki, all of Japan

[73] Assignee: Fujitsu Limited, Kawasaki, Japan

[21] Appl. No.: 671,958

[22] Filed: Mar. 19, 1991

[30] Foreign Application Priority Data

Mar. 19, 1990 [JP] Japan ................................ 2-66848

[51] Int. Cl.⁵ ............................................. G06F 15/38
[52] U.S. Cl. ....................................... 364/419.02
[58] Field of Search ................................ 364/419

[56] References Cited

U.S. PATENT DOCUMENTS

| | | | |
|---|---|---|---|
| 4,860,206 | 8/1989 | Kugimiya et al. | 364/419 |
| 5,163,081 | 11/1992 | Wycherley et al. | 379/52 |
| 5,175,684 | 12/1992 | Chong | 364/419 |

FOREIGN PATENT DOCUMENTS

| | | |
|---|---|---|
| 0311416 | 4/1989 | European Pat. Off. |
| 0357344 | 3/1990 | European Pat. Off. |
| 2199170 | 6/1988 | United Kingdom . |
| 2217067 | 10/1989 | United Kingdom . |

OTHER PUBLICATIONS

"User-Specified Spelling Supplement Support," IBM Technical Disclosure Bulletin, vol. 28, No. 8, Jan. 1986, Armonk, N.Y.

"Writeable Adaptive Transient Dictionary," IBM Technical Disclosure Bulletin, vol. 25, No. 2, Jul. 1982, Armonk, NY.

Primary Examiner—Roy N. Envall, Jr.
Assistant Examiner—Xuong Chung
Attorney, Agent, or Firm—Staas & Halsey

[57] ABSTRACT

A machine-translation/electronic-mail system comprises an electronic-mail receiving unit, an electronic-mail transmitting unit, a standard dictionary used in a machine translation process, and a private-use-word registering apparatus. The private-use-word registering apparatus comprises a word-definition recognition unit for recognizing a word-definition command for defining a private-use word used by a specified user, the word-definition command existing in an electronic mail containing a document, and a temporarily registering means for temporarily storing in a private-use word dictionary the private-use word having been extracted by the word-definition recognition unit, the private-use word dictionary being temporarily used in the translation as the private-use word dictionary.

12 Claims, 18 Drawing Sheets

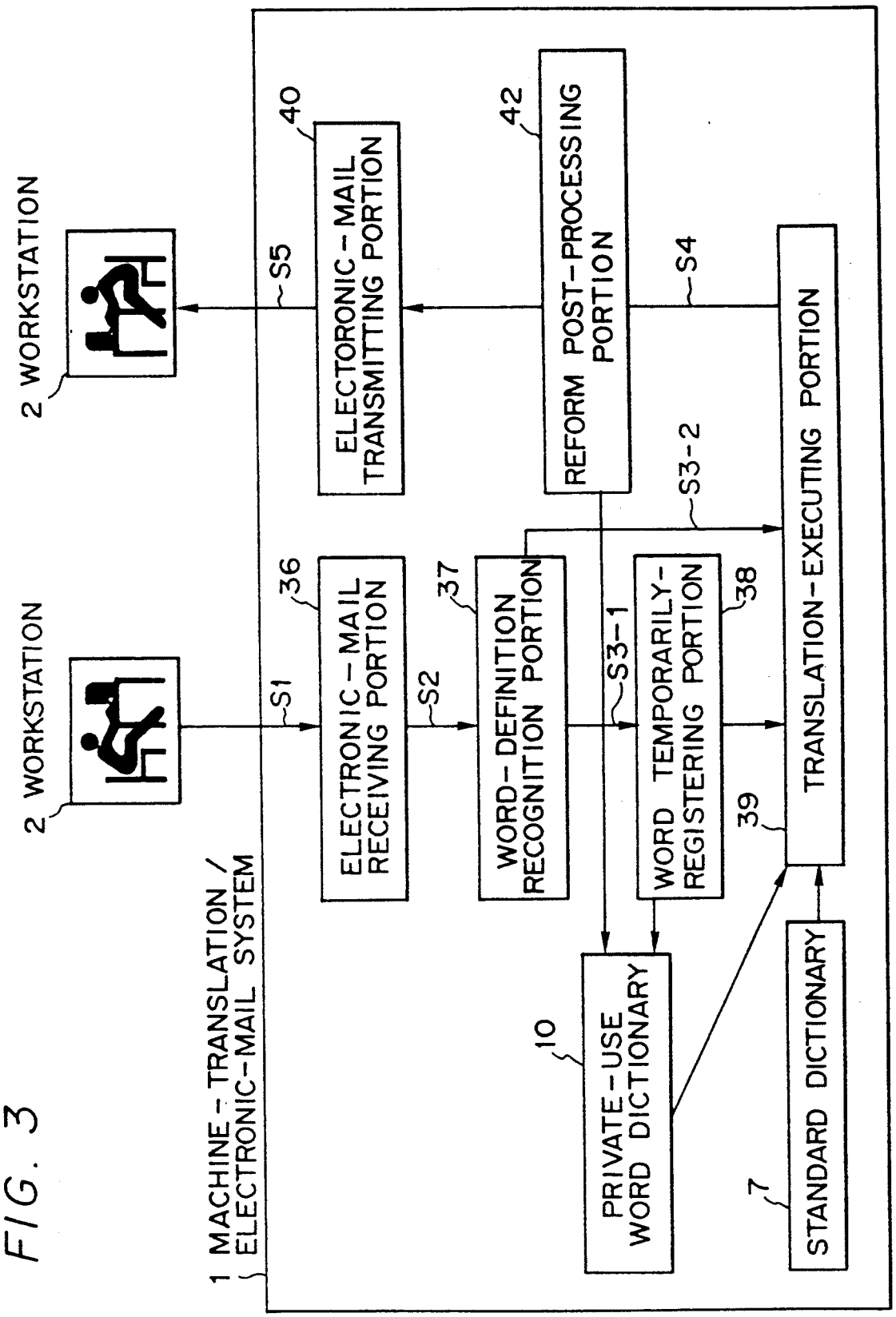

FIG. 4A   INPUT TO ELECTRONIC - MAIL
         RECEIVING PORTION (S1)

```
Data: Thu, 14 Sep 89  15:18:41 JST
From: nisino@utrillo.soft.flab.fujitsu.co.jp
Reply-To: nisino@utrillo.soft.flab.fujitsu.co.jp
To: translate@soft.flab.fujitsu.co.jp
Subject: je-1

コンパイラでソースプログラムを翻訳することにより
高性能が得られます。

.define 翻訳する / compile / 動詞
```

FIG. 4B   OUTPUT OF ELECTRONIC - MAIL
         RECEIVING PORTION (S2)

```
コンパイラでソースプログラムを翻訳することにより
高性能が得られます。

.define 翻訳する / compile / 動詞
```

FIG. 4C   OUTPUT OF WORD-DEFINITION
         RECOGNITION PORTION (S3)

WORD DEFINITION
INFORMATION (S3-1)

```
.define 翻訳する / compile / 動詞
```

TEXT (S3-2)

```
コンパイラでソースプログラムを翻訳することにより
高性能が得られます。
```

FIG. 4D  OUTPUT OF TRANSLATION-
EXECUTING PORTION (S4)

> High performance is obtained by compiling source program by compiler

FIG. 4E  OUTPUT OF ELECTRONIC-MAIL
TRANSMITTING PORTION (S5)

> Data: Thu, 14 Sep 89 15:36:48 JST
> From: translate@soft.flab.fujitsu.co.jp
> To: nisino@utrillo.soft.flab.fujitsu.co.jp
> Subject: je-1
>
> High performance is obtained by compiling source program by compiler

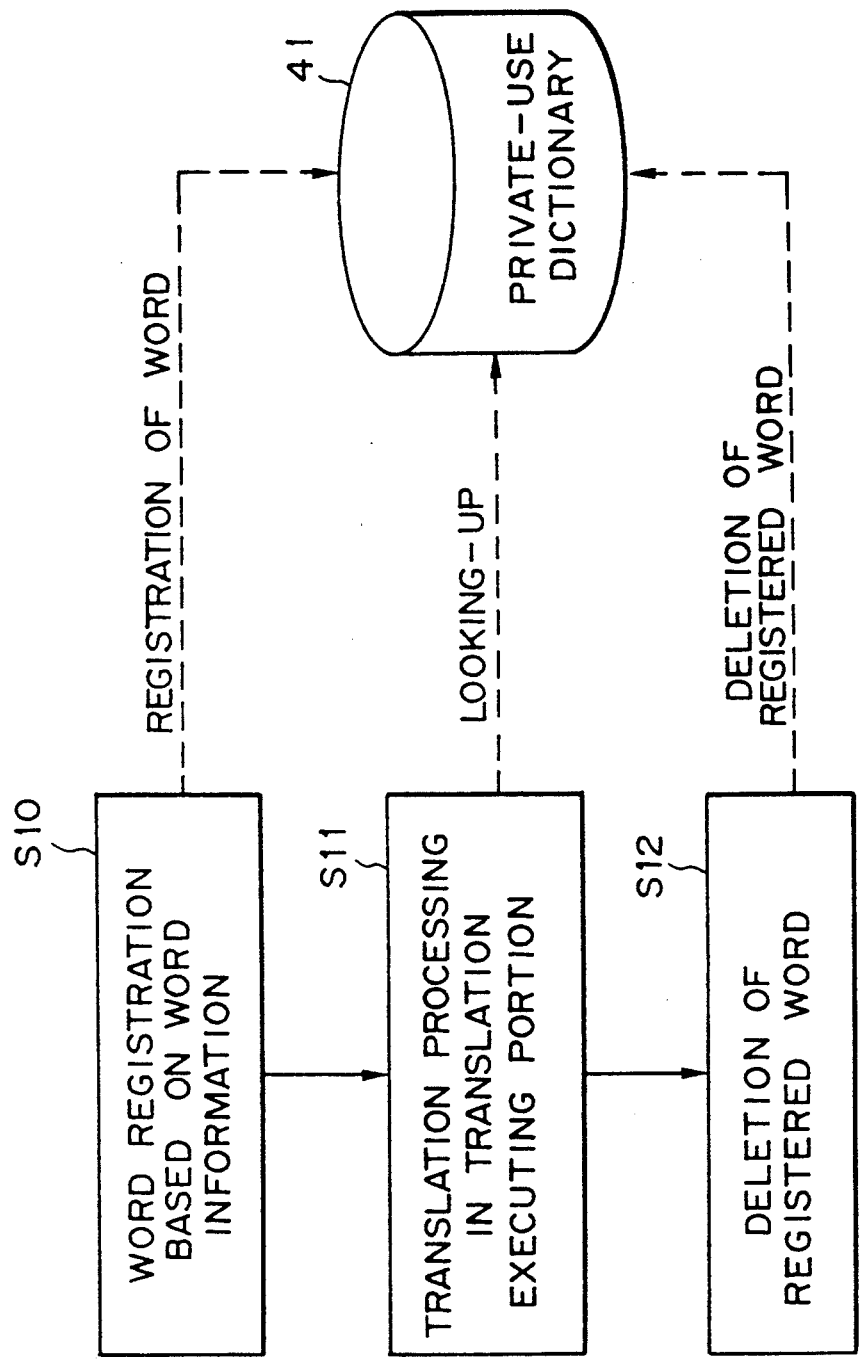

FIG. 8B

EXAMPLES OF INPUT AN OUTPUT IN EACH PORTION (1) OUTPUT OF WORD-DEFINITION RECOGNTION PORTION WORD-DEFINITION INFORMATION

```
.define ソースプログラム / source program
```

TEXT

```
コンパイラで ソースプログラム を コンパイルすることにより
高性能が得られます。
```

(2) PARTIALLY REPLACED TEXT

```
コンパイラで source program を コンパイルする
ことにより 高性能が得られます。
```

(3) OUTPUT OF TRANSLATION-EXECUTING PORTION

```
High performance is obtained by compiling
source program by compiler
```

APPARATUS FOR REGISTERING PRIVATE-USE WORDS IN MACHINE-TRANSLATION/ELECTRONIC-MAIL SYSTEM

BACKGROUND OF THE INVENTION

The present invention relates to a machine-translation/electronic-mail system which performs a translation of a document mailed by an electronic mail to obtain a desired translation result issued from the system to designated users, and more particularly to a private-use word registering apparatus of a machine-translation/electronic-mail system which permits users to register and search a private-use word used by them.

As a result largely of progress in hardware and software technologies in recent years, we have now reached a position where machine translation has become substantially possible. Furthermore, it has become possible for computers such as word processing machines, personal computers, workstations, general-purpose computers and the like to communicate with each other through electric mails. Therefore, a machine-translation apparatus can be combined with an electronic-mail apparatus to produce a so-called machine-translation/electronic-mail system of a conventional type.

In using of the conventional machine-translation/electronic-mail system, the user operates an editor unit provided in his own computer to prepare texts such as treatise and the like to be translated. This text is then inputted through the electronic mail to the system of another computer with a machine-translation apparatus. The other computer, having received the electronic mail, analyzes it to extract the text being translated, and performs a machine translation on the text to obtain a translation result. The thus obtained translation result is then delivered by the system to designated users through the electronic mails. Consequently, it is possible for all the users to obtain the translation result through the electronic mail by utilizing the conventional system. Therefore, the users do not need to purchase the machine-translation apparatus for their own computers, to lease another computer provided with the machine-translation apparatus, or out to use another computer provided with the machine-translation apparatus. As is clear from the above description, the conventional machine-translation/electronic-mail system is advantageous in effect.

However, the conventional machine-translation/electronic-mail system has the disadvantage that the user cannot directly operate the standard dictionary provided in the conventional system, and, therefore he cannot register his own private-use word. Thus, the result of the machine translation differs considerably differs from the user's desired result with the continuing progress in engineering development, a great number of new words are appearing. These words may be newly created or may be existing words with new meanings different from their conventional meanings. Consequently, the disadvantage of the conventional machine-translation/electronic-mail system is becoming increasingly serious.

SUMMARY OF THE INVENTION

Therefore, it is an object of the present invention to provide a private-use word registering apparatus for temporarily storing a special word used by a specified user in a machine-translation/electronic-mail system which permits the user to register and search the private-use word, thereby permitting the user to obtain a desired translation result.

A feature of the present invention resides in a machine-translation/electronic-mail system comprising an electronic-mail receiving unit, an electronic-mail transmitting unit and a standard dictionary used in a machine translation process, the improvement wherein said machine-translation/electronic-mail system comprises a private-use-word registering apparatus comprising: a word-definition recognition means for recognizing a word-definition command for defining a private-use word used by a specified user, and extracts a word to be registered as said private-use word, which word-definition command exists in an electronic mail containing a document comprising said word to be translated, said electronic mail being produced in a computer and received by an electronic-mail receiving unit of an electronic computer, said computer being able to communicate with said machine-translation/electronic-mail system through said electronic mail; a word temporarily-registering means for temporarily storing in a private-use word dictionary said private-use word having been extracted by said word-definition recognition means, said private-use word dictionary being temporarily used in the translation as a private-use word dictionary; and a translation means for performing the translation by the use of said private-use-word dictionary having been registered by said word temporarily-registering means together with said standard dictionary, to obtain a translation result which is issued to said electronic-mail transmitting unit from which said translation result is delivered to designated users through said electronic mail.

BRIEF DESCRIPTION OF THE DRAWINGS

FIG. 3 is a schematic diagram of the machine-translation/electronic-mail system of an embodiment of the present invention, illustrating the process flow of the system, FIGS. 4A to 4E are parts of a block diagram of the translation process performed by the machine-translation/electronic-mail system of the present invention shown in FIG. 3, illustrating the contents of the stages or steps of the translation process, respectively, FIGS. 5A to 5E are a block diagram and flowcharts of the first practical embodiment of the present invention, respectively, FIGS. 8A and 8B are a block diagram and a flowchart of another embodiment of the present invention, respectively.

PREFERRED EMBODIMENT

Figure 1:
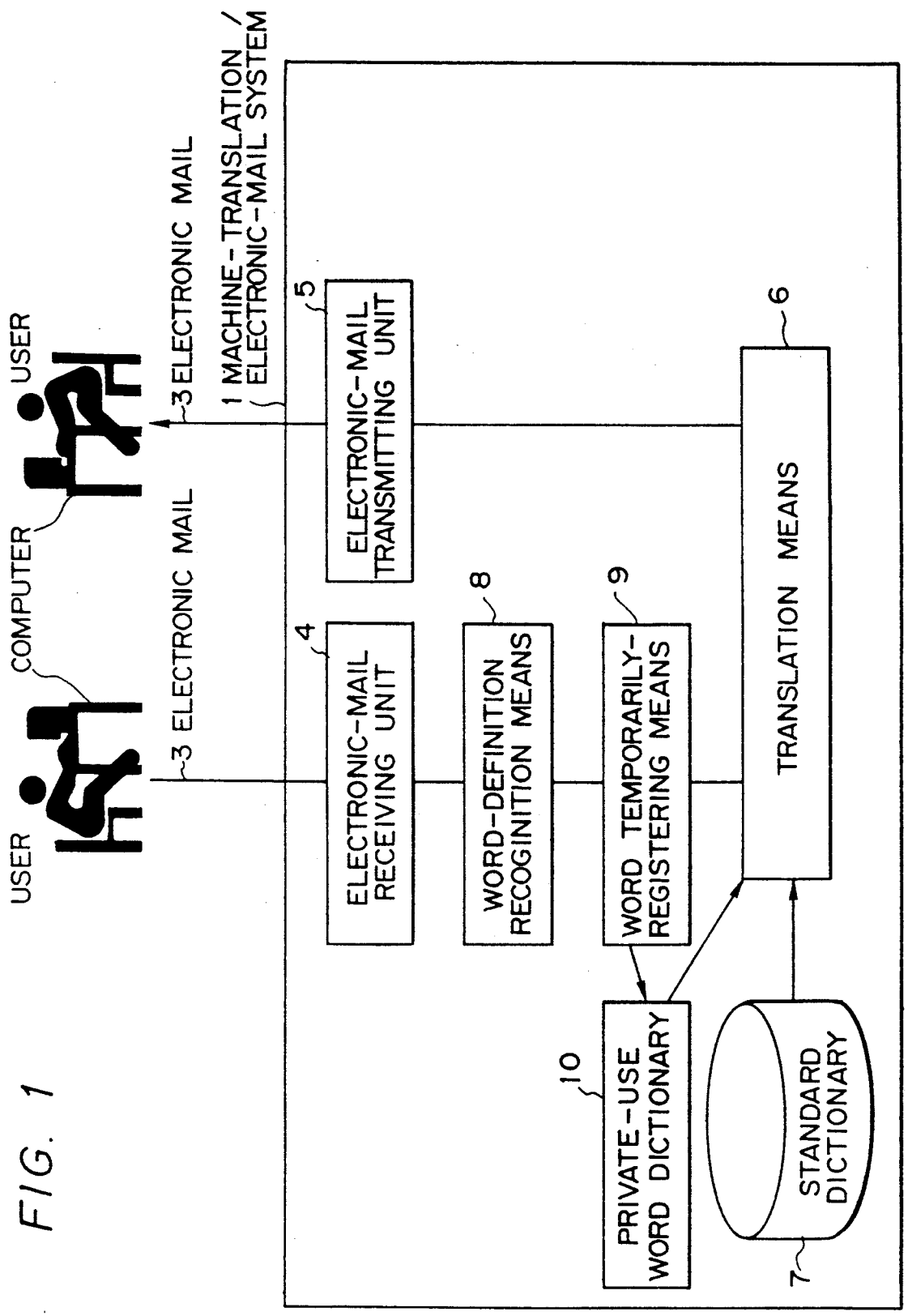
FIG. 1 is a block diagram of a principle of the present invention.

FIG. 1 is a block diagram of a principle of a machine-translation/electronic-mail system 1 according to the present invention, illustrating the functions of the system. The present invention was made on the premise that the machine-translation/electronic-mail system 1 comprises computers or workstations 2 for preparing documents to be translated, an electronic-mail receiving unit 4 for receiving an electronic mail 3 through which the workstations 2 communicate with the system or electronic computer 1, and an electronic-mail transmitting unit 5 for transmitting the electronic mail 3 in which system 1 is incorporated. In addition, the machine-translation/electronic-mail system 1 has a dictionary (standard dictionary) 7 which is used when it performs a translation process.

The machine-translation/electronic-mail system or electronic computer 1 has a word-definition recognition means 8. The word-definition recognition means 8 of system 1 recognizes information as to a source-language word and a target-language word by extracting a portion defining a word (i.e., a private-use word which is used by the user, translated into his requested meaning in the target language) from a text of the electronic mail 3 which has been received by the electronic-mail receiving unit 4 of the system and has had its header (such as date of the electronic mail, address of sender, address of recipient and the like) removed to leave only the text.

Then, a temporarily-registering means 9 of the machine-translation/electronic-mail system 1 temporarily stores in a private-use dictionary 10 (temporarily used in the translation process as a private-use word dictionary) the private-use word extracted by the word-definition recognition means 8. Then, a translation means 6 of the machine-translation/electronic-mail system 1 translates the text (except a word-definition sentence) in the source language into a desired meaning in the target language, with reference to the private-use word dictionary and the standard dictionary, to obtain a translation result. The translation result is then issued to the electronic-mail transmitting unit 5 from which it is sent to the designated users 2 through the electronic mails 3.

In use, each user operates his own editor machine or word processing machine comprising the computer 2 to prepare a document in the source language to be translated. Where a word has a new meaning or a user requests a meaning different from the conventional meaning, such word is defined as a private-use word. The document prepared in the source language must therefore be pre-processed accordingly. The pre-processed document is then delivered from the computer or workstation 2 to the machine-translation/electronic-mail system 1 via the electronic mail 3.

The electronic mail 3 delivered from the computer 2 is received by the electronic-mail receiving unit 4 of the machine-translation/electronic-mail system 1. Then, by the electronic-mail receiving unit 4 of the system 1, the received electronic mail is conveniently divided into text and header, and only text in the source language is issued to the word-definition recognition means 8 of the system 1.

Consequently, the word-definition recognition means 8 of the system 1 analyzes the text in the source language of the electronic mail 3 to judge whether or not a description for defining the private-use word is contained in the text in the source language. If it is, the word-definition recognition means 8 of the system 1 extracts, from the description, information as to the private-use word in the source language to be translated; the meaning of the private-use word in the target language; morphological data of the private-use word; and like data. This extracted information is issued from the word-definition recognition means 8 to the temporarily-registering means 9 of the system 1. Then, in the temporarily-registering means 9, the text except the definition of the private-use word is judged to be source text to be translated, and is therefore issued from the temporarily-registering means 9 to the translation means 6 of the machine-translation/electronic-mail system 1.

At the same time, the temporarily-registering means 9 of the system 1 temporarily stores in the private-use word dictionary 10 (which is temporarily used in the translation process as the special-word dictionary) the information on the private-use word extracted by the word-definition recognition means 8. After the user has registered the private-use word in the private-use word dictionary 10 through the temporarily-registering means 9 of the machine-translation/electronic-mail system 1, the translation means 6 of the system 1 begins to translate the source text into the user's requested meaning in the target language, with reference to the private-use word dictionary and the standard dictionary 7.

In the translation process performed by the translation means 6 of the system 1, the translation means 6 first looks up the private-use dictionary to find the word appearing in the source text. If the word's meaning in the target language is found in the temporary dictionary, this meaning is employed in the translation. If the word's meaning in the target language is not found in the temporary dictionary, the standard dictionary is then looked up by the translation means 6 of the system 1 to obtain a translation result of the source text.

After completion of the translation process by the translation means 6 of the system 1, the translation result is issued from the translation means 6 to the electronic-mail transmitting unit 5 of the system 1. In the electronic-mail transmitting unit 5, the header such as the data of the electronic mail, address of sender, address of recipient and the like is added to the translation result of the source text to prepare an electronic mail 3 which is delivered to each of the designated users 2. Thus, the users are informed of the translation result through the electronic mail 3.

Hereinbelow, embodiments of the present invention are described in detail with reference to FIG. 2 to 8 of the accompanying drawings.

Figure 2:
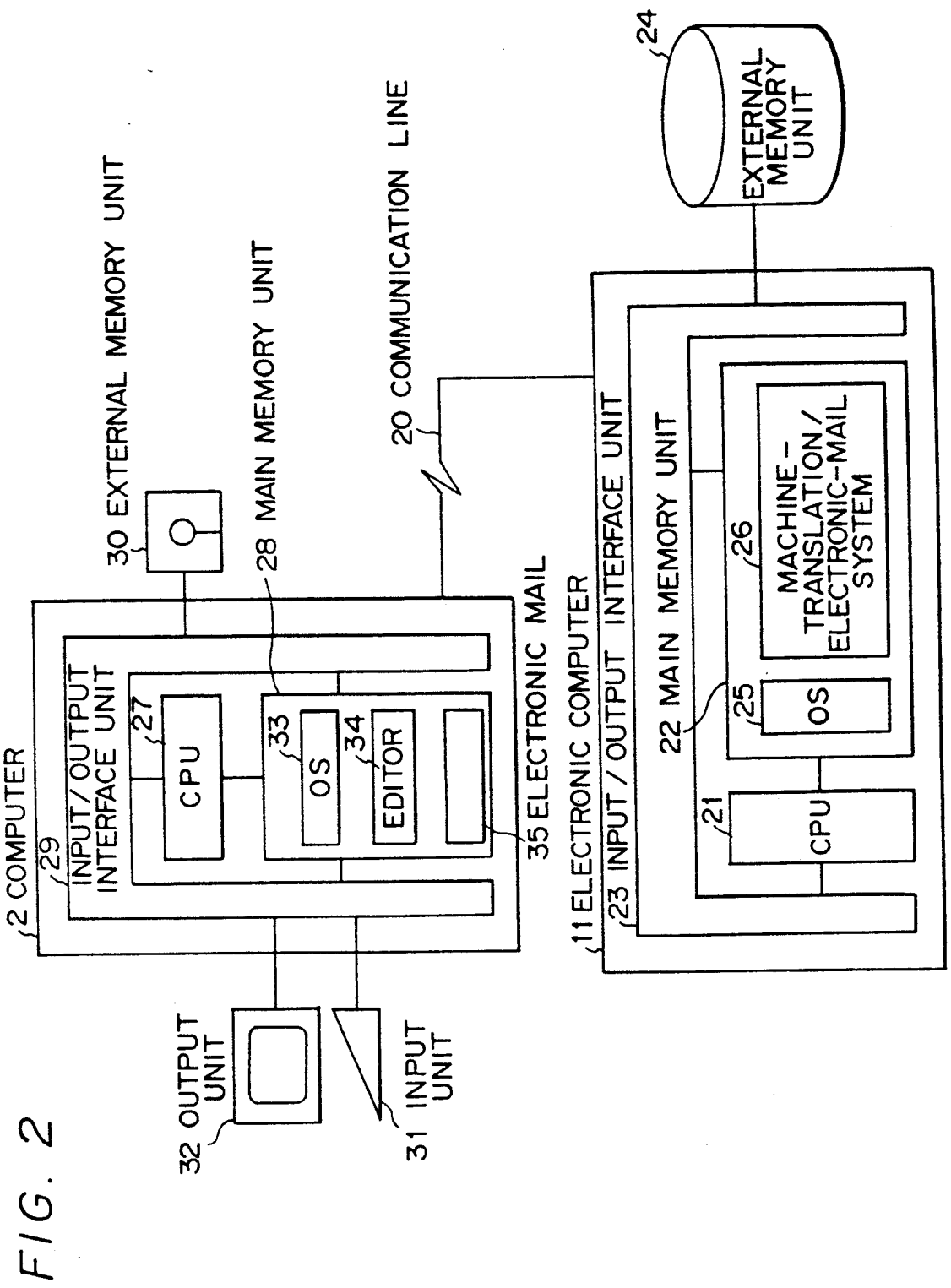
FIG. 2 is a schematic diagram of the machine-translation/electronic-mail system of the present invention, illustrating the architecture of the system.

FIG. 2 is a schematic diagram of an embodiment of the machine-translation/electronic-mail system of the present invention, illustrating the system's architecture.

The present invention was made on the premise that the system comprises an electronic computer 11, a computer or workstation 2 and a communication line 20 through which the electronic computer 11 communicates with the computer 2.

The electronic computer 11 may be a large-sized general-purpose computer, a super minicomputer, a workstation, and personal computer or a like instrument, provided that the instrument carries both a machine-translation apparatus and an electronic-mail apparatus. The other computer 2 may be a word processing machine or a like instrument, provided that the instrument carries both an editor software or word processing software for preparing a desired document, and an electronic-mail apparatus. The electronic mail permits the electronic computer 11 to communicate with the computer 2 through the communication line 20.

The electronic computer 11 is constructed of suitable components such as a central processing unit or CPU 21, a main memory unit 22, an input/output interface unit 23 and suitable connecting lines which interconnect components 21, 22, and 23. The CPU 21 of the electronic computer 11 performs a necessary process in accordance with a program stored in the main memory unit 22 of the computer 11. The input/output interface unit 23 of the computer 11 is connected to suitable external means such as an external memory unit 24, communication line 20 and the like to permit data to be inputted to or outputted from these external means as to the electronic computer 11. The main memory unit 22 of the computer 11 carries an operating system (OS) 25 and a machine-translation/electronic-mail system 26 which constitutes a central component of the embodiment of the present invention.

The machine-translation/electronic-mail system 26 of the computer 11 utilizes a program permitting the computer 11 to receive an electronic mail to extract a definition of a user's private-use word from a document in a source language contained in the electronic mail. Thus, the system 26 prepares a temporary dictionary for temporarily storing a private-use word used by the user, and the document in the source language contained in the electronic mail is subjected to a machine-translation process by the system 26 to produce a translation result in a target language. This translation result is then delivered to each of the designated users through an electronic mail.

The computer or workstation 2 has substantially the same construction as the electronic computer 11. As shown in FIG. 2, a central processing unit (CPU) 27 is disposed in the center of the workstation 2 and is connected to a main memory unit 28 and an input/output interface unit 29 to which are connected the communication line 20, an external memory unit 30 constructed of a hard disk unit and a floppy disk unit, an input unit 31 such as a keyboard unit and like input means, and an output unit 32 such as a display unit. The input/output interface unit 29 of the workstation 2 permits these units 27, 28, and 30 to communicate with the input unit 31 and the output unit 32 of the computer 2.

The main memory unit 28 of the computer 2 carries an editor 34 for preparing a necessary document and a receiving/transmitting software 35 used for receiving/transmitting the electronic mail, together with an operating system (OS) 33. The CPU 27 performs a necessary operation in accordance with such software.

The action of the computer 2 system is described hereinbelow.

First, the user inputs a necessary starting command such as a log-on command to the computer 2 through the input unit 21 to start the computer 2. Then he begins to operate the editor 34 based on the operating system (OS) 33. In this operation, he inputs a desired source document into the computer 2 through the input unit 31 and edits it using functions of the editor 34. At this time, a private-use word used by the user is defined in the source document according to a predetermined definition method, to be described later.

Next, the user uses the receiving/transmitting software 35 of the electronic mail to permit the source document (prepared by the use of the editor 34) to be transmitted by an electronic mail to the machine-translation/electronic-mail system 26 of the electronic computer 11 through the communication line 20. This electronic mail has a header containing data as to the address of the recipient, the target language and like items.

In the electronic computer 11, the machine-translation/electronic-mail system 26 is operated based on the operating system (OS) 25. The electronic computer 11 receives the electronic mail delivered from the computer 2 to the machine-translation/electronic-mail system 26 through the input/output interface unit 23 of the computer 11.

In the machine-translation/electronic-mail system 26, the thus received electronic mail is divided into text and header portions, and then judged as to whether or not the text portion contains a definition of a private-use word. After all the private-use words have been thus judged, they are registered or temporarily stored in the private-use word dictionary. The translation process is then performed in accordance with the target language appearing in the header portion of the electronic mail to produce the translation result in the target language. This translation result is delivered by electronic mail to each designated user or recipient whose address appears in the header portion of the electronic mail.

The electronic mail thus delivered from the machine-translation/electronic-mail system 26 is received by the computer 2 through the communication line 20. In the workstation or computer 2, the receiving/transmitting software 35 permits the electronic mail thus received to be displayed on a screen of the output unit 32 such as a display unit, thereby permitting each designated user to confirm receipt of the electronic mail. Upon confirmation of receipt of the electronic mail, each of the designated users operates the output unit 32 of the computer 2 to output the contents of the electronic mail, thereby permitting each of the designated users to obtain the translation result in the target language.

FIG. 3 is a schematic diagram of an embodiment of the present invention, illustrating the architecture of the embodiment, and more particularly illustrating the flow of the translation process performed by the embodiment of the present invention, which is described below.

First of all, a document in the source language to be translated into the target language is prepared through a workstation 2-1. The thus prepared document in the source language is delivered to the machine-translation/electronic-mail system 1 by the electronic mail S1 containing the above document in which a definition of the private-use word is contained. In the machine-translation/electronic-mail system 1, the electronic-mail receiving portion 36 first receives the electronic mail S1 and then divides it into a text portion S2 and a header portion containing the address of the recipient, the target language, data of the electronic mail and like items. The text portion S2 of the electronic mail S1 is then issued from the electronic-mail receiving portion 36 to a word-definition recognition portion 37.

In the word-definition recognition portion 37, sentences contained in the text portion S2 of the electronic mail S1 are judged line by line as to whether each of the sentences constitutes a proper object of translation or a definition statement of the private-use word. If the sentence contained in the text portion S2 constitutes the definition statement of the private-use word, the contents of the definition statement are extracted to determine a meaning S3-1 in the target language of the private-use word (hereinafter referred to as the target-language meaning S3-1 of the private-use word). As shown in FIG. 3, the thus determined target-language meaning S3-1 of the private-use word is issued to a temporarily-registering portion 38 from the word-definition recognition portion 37. If the sentence contained in the text portion S2 of the electronic mail S1 does not constitute the definition statement of the private-use word, it is judged that the subject sentence constitutes the proper object S3-2 of translation, hereinafter referred to as the source text S3-2. The thus judged source text S3-2 is issued from the word-definition recognition portion 37 to a translation-executing portion 39. The temporarily-registering portion 38 receives the target-language meaning or definition statement S3-1 of the private-use word, and registers or temporarily stores the private-use word in a private-use word dictionary 10 to prepare a private-use word dictionary.

As a result, the translation-executing portion 39 receives the source text S3-2 to translate the same S3-2 into the target language with reference to the private-use word dictionary 10. In the process of translating the source text S3-2 into the target language, the private-use word dictionary 10 is first referred to. If the word contained in the source text S3-2 to be translated into the target language is not found in the private-use word dictionary 10, the standard dictionary 7 is referred to perform the translation of the source text S3-2, thereby permitting the translation-executing portion 39 to obtain a translation result S4 in the target language. This result S4 is then issued from the translation-executing portion 39 to an electronic-mail transmitting portion 40 in which a header portion containing necessary data as to the date of the electronic mail, the address of the recipient, the address of the sender and the like is added to the translation result S4 to complete a proper form of electronic mail S5 which is delivered to a workstation 2-2. The translation result S4 is subjected to post-processing unit 42 such as deletion of the registered private-use word before the translation result S4 is applied to electronic mail transmitting portion 40.

The workstation 2-1 may be the same as the workstation 2-2 and thus a single user transmits and receives the mail to and from machine-translation/electronic mail system 1.

Upon receipt of the electronic mail S5, the workstation 2-2 permits its display unit to display the contents of the electronic mail, thereby permitting each designated user to know that the translation result S4 has been properly translated into the target language using the desired target-language meaning S3-1 of the private-use word.

FIGS. 4A to 4E are parts of a block diagram of a translation process performed by the machine-translation/electronic-mail system of the present invention, illustrating the contents of each stage in the process.

FIG. 4A is a block diagram illustrating the contents of the electronic mail S1 delivered from the workstation 2-1. In the electronic mail S1, the first five lines constitute the header portion of the mail S1 and the remaining lines constitute the text portion S2. In the header portion, the first line shows the date of the mail S1, the second line shows the address of the sender; the third line shows the address of the recipient of the translation result S4; the fourth line shows the address of the recipient of the electronic mail, i.e., the address of the machine-translation/electronic-mail system 1; and the fifth line shows the target language into which the text portion S2 of the electronic mail S1 described in the source language must be translated. In the embodiment of the present invention shown in FIGS. 4A to 4E, the source language is Japanese, and the target language is English.

The following part of the text portion S2 of the electronic mail S1 described in Japanese is the proper object of translation into English:

" コンパイラで作られよ ."

The text portion S2 of the electronic mail S1 is followed by the definition of the private-use word. In this embodiment of the present invention, as shown in FIGS. 4A to 4C, a definition command ".define" is used to define the special word used by the user. This command ".define" is followed by a set of necessary items: the subject special word in the source language, a word in the target language corresponding to the private-use word in the source language and a "parts of speech" classification in this order. This permits the private-use word to be clearly defined.

FIG. 4B is a block diagram illustrating the contents of the text portion S2 of the electronic mail S1. This text portion S2 is issued from the electronic-mail receiving portion 36 of the machine-translation/electronic-mail system 1 shown in FIG. 3, the text portion S2 of the electronic mail S1 being the remaining portion of the electronic mail S1 after the header portion of the electronic mail S1 is removed from the mail S1.

FIG. 4C is a block diagram illustrating the contents of output signals S3 issued from the word-definition recognition portion 37 of the machine-translation/electronic-mail system 1 shown in FIG. 3. In the word-definition recognition portion 37, the text portion S2 of the electronic mail S1 is judged line by line as to the target-language meaning S3-1 of the private-use word and the source text S3-2 to be translated. As is clear from an upper block of FIG. 4C, a line starting with an item ".define" corresponds to the target-language meaning S3-1 of the private-use word. In this line, the following private-use word or verb (in the Japanese language which is the source language):

" 翻訳は " (which generally corresponds to the English verb "translate") is specified to be translated into the English word "compile", the English word being classified in the verb according to the "parts or speech" classification. In the lower block of FIG. 4C, lines starting with the following Japanese word:

" コンパイラで "

constitute the source text S3-2 to be translated into English: the target language in this case.

FIG. 4D is a block diagram illustrating the translation result S4 in the target language. This result S4 is issued from the translation-executing portion 39 of the machine-translation/electronic-mail system 1 shown in FIG. 3. In this translating result S4, the above special word " 翻訳は " in Japanese which is the source language has been translated into the English word "compiling". In the translation process performed by the translation-executing portion 39 of the machine-translation/electronic-mail system 1, the private-use word " 翻訳は " is first looked up in the temporary dictionary in the source language, so that a corresponding special word "compile" in the target language is found. This corresponding special word "compile" is then transformed into its gerund form "compiling" according to the "parts of speech" classification, thereby permitting the proper translation result S4 to be obtained.

FIG. 4E is a block diagram illustrating the electronic mail S5 issued from the electronic-mail transmitting portion 40 of the machine-translation/electronic-mail system 1 shown in FIG. 3. In preparing the electronic mail S5, the header portion containing necessary data as to the data of the electronic mail, the address of the recipient, the address of the sender and the like is added to the translation result S4 to complete the proper form of the electronic mail S5 delivered to a workstation 2-2.

In the header portion of the electronic mail S5, the data of the mail S5 is shown in the first line, the address of sender is shown in the second line, the address of recipient is shown in the third line, and the target language is shown in the fourth line.

FIGS. 5A, 5B, 5C, 5D, 6A, 6B, 6C, 7A, 7B and 7C are block diagrams and flowcharts of embodiments of the word-definition recognition portion 37 and the temporarily-registering portion 38 of the machine-translation/electronic-mail system 1 shown in FIG. 3, illustrating three types of additional embodiments of the present invention.

FIG. 5A is a block diagram of the first type of the additional embodiments of the present invention, illustrating a process flow performed by the first type.

In the process shown in FIG. 5A in the first step S10 of the process, the private-use word used by the user is registered or temporarily stored in the private-use dictionary 41 according to the contents of the definition statement of the special word appearing in the text portion of the electronic mail, thus forming a private-use word dictionary 41. This dictionary 41 is shared with the other users. Then, in the second step S11, the translation-executing portion 39 of the machine-translation/electronic-mail system 1 shown in FIG. 3 performs the translation process with reference to the private-use word dictionary or private-use word dictionary 41. Finally, in the third step S12, the special word having been registered in the private-use word dictionary or private-use word dictionary 41 is deleted from the dictionary 41 to prevent users in other fields from using the translation in the target language of the subject private-use word. If the private-use word is not deleted from the dictionary 41 in the third step S12, since the private-use word dictionary 41 is shared by the users in other fields there is a danger that the subject private-use word will be translated into the target language in other fields.

Figure 5B:
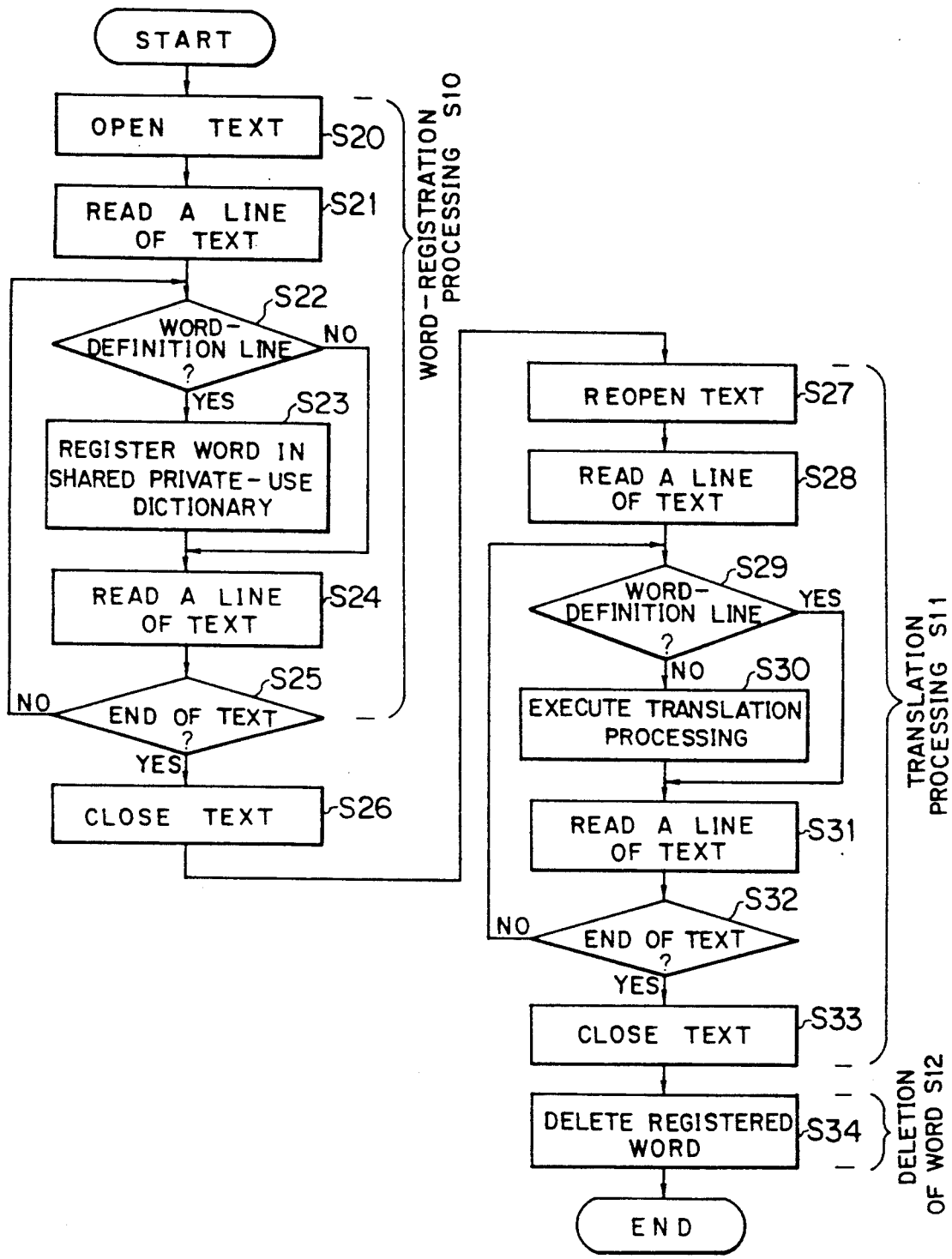

FIG. 5B is a flowchart of the translation process shown in FIG. 5A.

As is clear from the flowchart shown in FIG. 5B, in the step S20, the text in the source language is opened. Then, in the step S21, the first line of the text in the source language is read. In the step S22, it is judged whether or not the first line of the text is the definition statement of the private-use word, i.e., whether or not the first line of the text starts with the item ".define". If it does, it is judged to be the definition statement of the special word. If it does not, it is judged to be the object of translation.

If in the third step S22, the first line of the text is judged to be the word definition line of the private-use word.(YES), in a step S23 data of the subject private-use word (comprising, for example, the private-use word in the source language, its corresponding private-use word in the target language, "parts of speech" classification of the private-use word, and like data) is registered or temporarily stored in the private-use word dictionary or private-use word dictionary 41 which is shared by users in the specified field. Thereafter, the step S24 is performed. However, if in the third step S22, the first line of the text is judged to be not the word definition line of the private-use word (NO), the step S22 is followed by a step S24 in which the second line of the text is read. Then it is judged in a steps 25 whether or not the text has lines still not read. If there are lines still not read (NO), the step S25 is followed by the step S22 in which it is judged whether the line having been read is the word definition line of the private-use word or the object of translation. If every line of the text has been already read, i.e., if there is no line to be read in the text (YES), the step S25 is followed by a step S26 in which the text is closed so that the step S10 shown in FIG. 5A if finished. The step S10 is hereinafter referred to as a word registering step S10 which is followed by the step S11 or translation-processing step S11.

Also in the translation-processing step S11, the text in the source language is read from its first line to the end so that only the object of translation of the text or source text except the word definition line of the private-use word is translated into the target language. More particularly, first of all, in a step S27 of the flowchart shown in FIG. 5B, the text in the source language is opened again so that the step S27 is followed by a step S28 in which the text is read from the line thereof. The step S28 is then followed by a step S29 in which every line of the text is judged as to whether or not it is the word definition line of the private-use word. If it is not (NO), the step S29 is followed by a step S30 in which the line of the text in the source language is translated into the target language. If it is (YES), the tenth step S29 is followed by a step S31.

In the step S31 of the flowchart shown in FIG. 5B, the line following the text is read so that the step S31 is followed by a step S32 in which the subject following line of the text is judged as to whether or not it is the last line of the text, i.e., as to whether or not there is a line still not read in the text. If there is a line still not read (NO), the step S32 is followed by the step S29 to cycle the above procedure, thereby permitting every line of the text except the word definition line of the private-use word to be translated into the target language. If there is no line still not read (YES), the step S32 is followed by a step S33 in which the text is closed so that the translation-processing step S11 is finished.

Finally, the private-use word, which has been registered in the private-use word dictionary or temporary dictionary 41 in the word-registering step S10 shown in FIGS. 5A and 5B is deleted from the private-use dictionary 41 in a step S34 of the flowchart shown in FIG. 5B, so that the process of translating the text is finished, as illustrated in the flowchart.

Figure 5C:
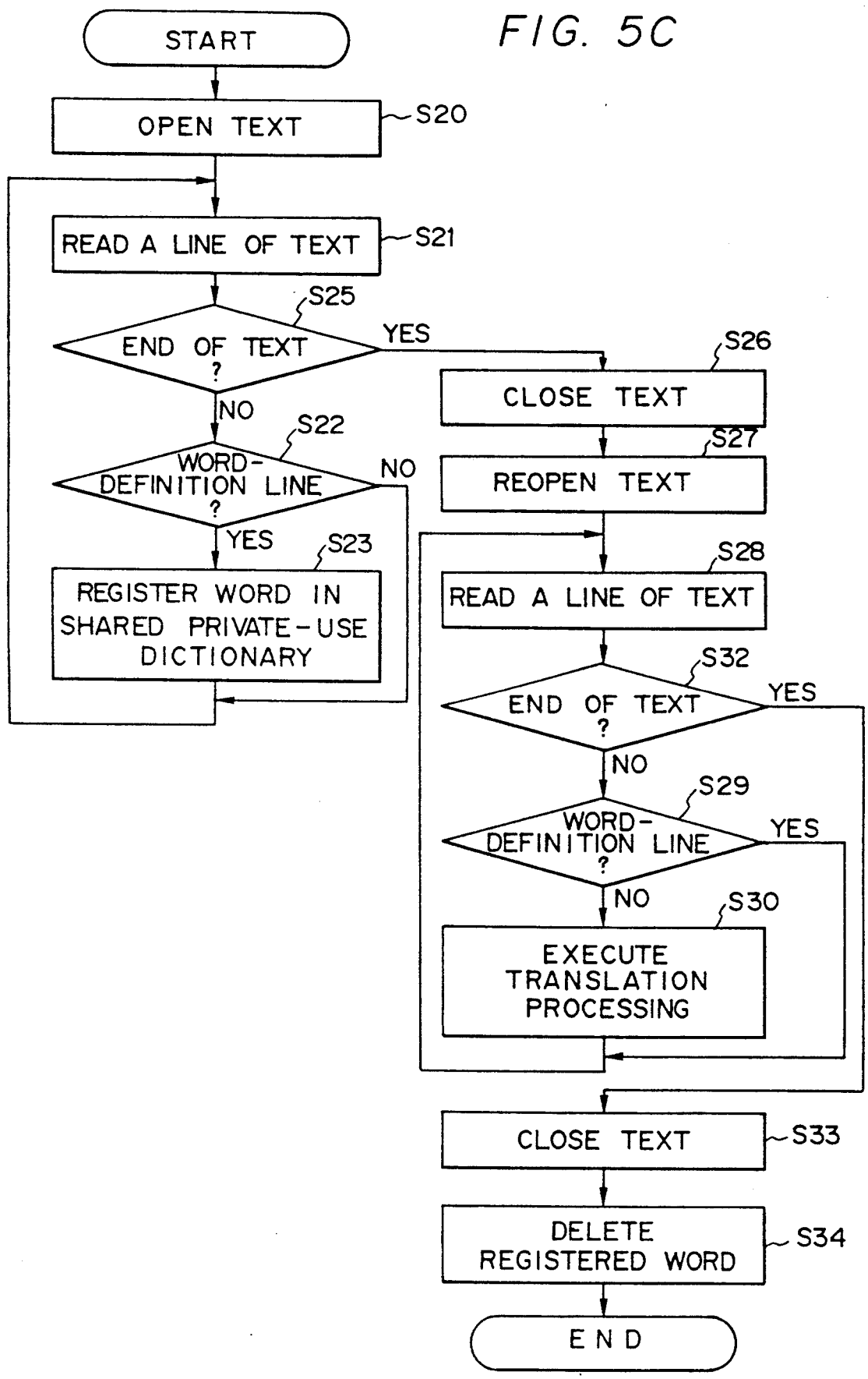

FIG. 5C shows a modified version of the flowchart shown in FIG. 5B. Like steps in FIGS. 5B and 5C are designated by like reference numbers. In FIG. 5C, a determination as to the end of the text is made before determining whether a line is a word definition line (S22). A determination as to the end of the file (S32) is also performed before it is determined whether the line is the word definition line (S29).

Figure 5D:
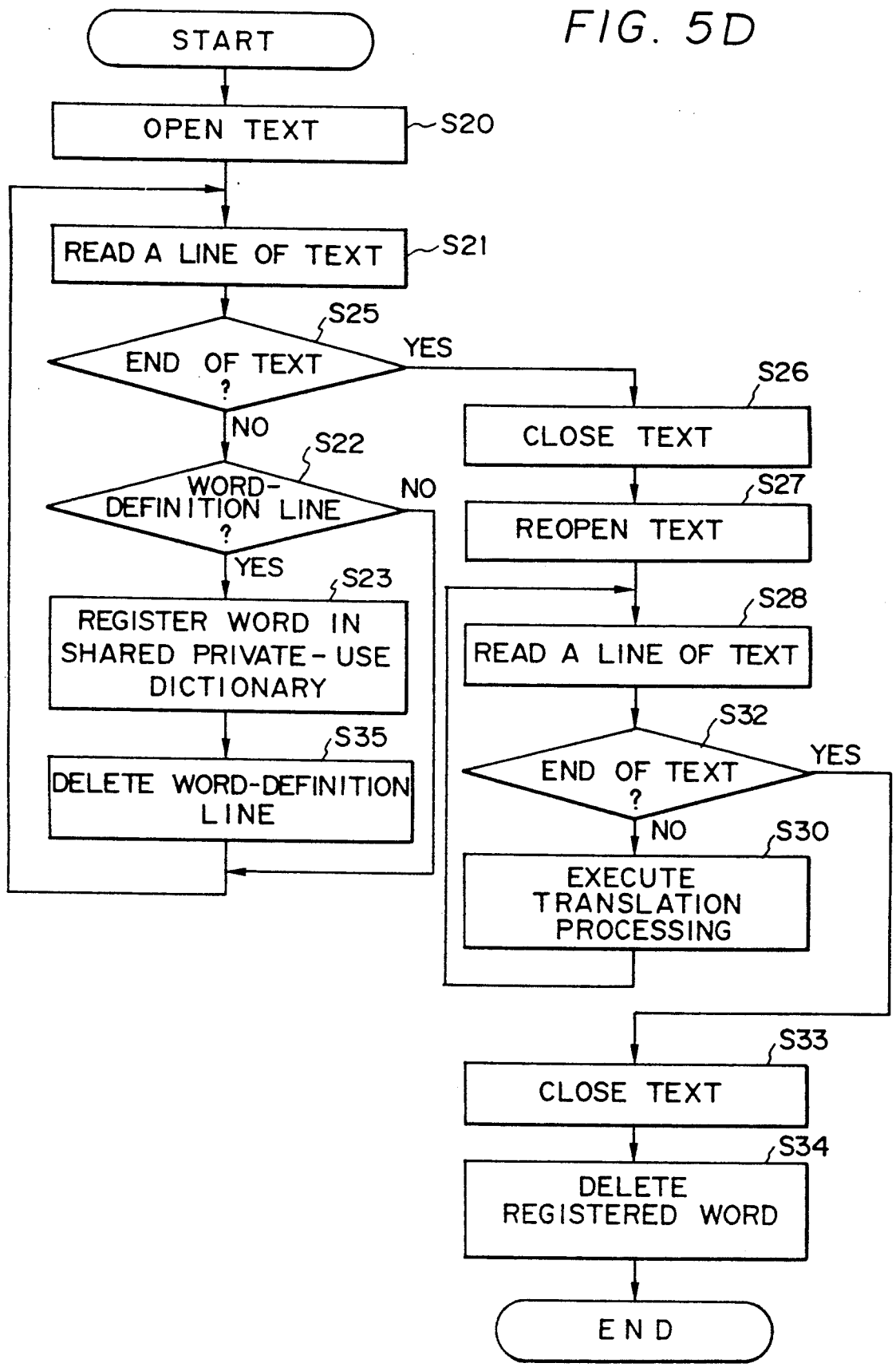

FIG. 5D shows a flowchart of an embodiment in which a word definition line is deleted after the private-use word is registered. Like steps in FIGS. 5C and 5D are designated by like reference numbers. As shown in step S35, a private-use word definition line is deleted after the private-use word is registered in a private-use word dictionary at step S23. Therefore, when the translation is executed, it is unnecessary to determine whether the line is the word definition line. Thus, in FIG. 5D, step S29 for determining the word definition line shown in FIG. 5C is unnecessary.

Figure 5E:
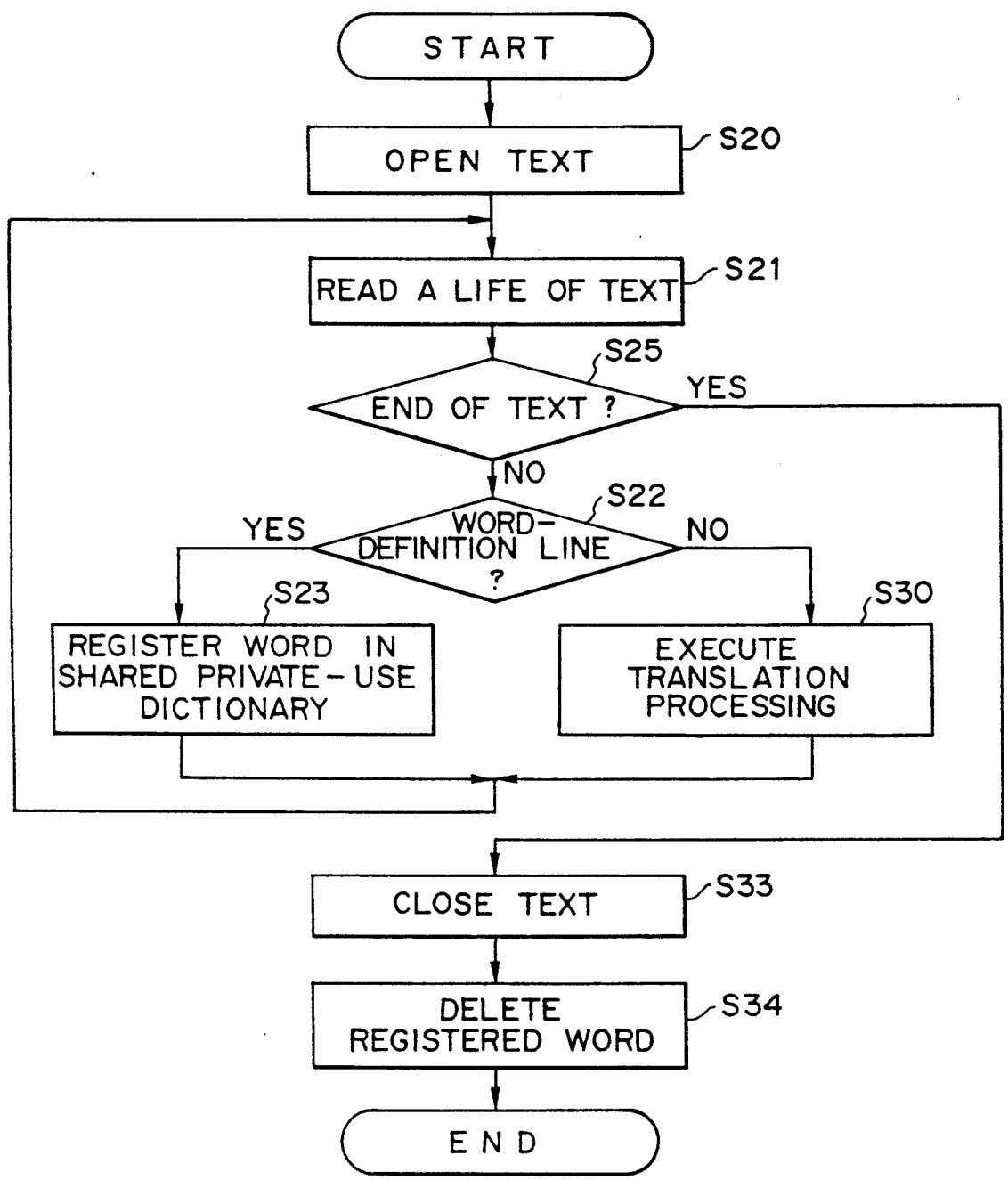

FIG. 5E shows a flowchart of an embodiment in which a definition of the word is changed in the body of the text. Like steps in FIGS. 5D and 5E are designated by like reference numbers. When the line is determined as the word definition line at step S22, the word is registered in the private-use word dictionary in the body of the text. Thereafter, one line of the text is again read at step S21. If the line does not constitute the end of the text at S25, and in addition does not constitute the word definition line, the translation is executed as shown in step S30. Thus, the translation can be performed by referring to the private-use word dictionary in which the word is newly registered at step S23.

Figure 6A:
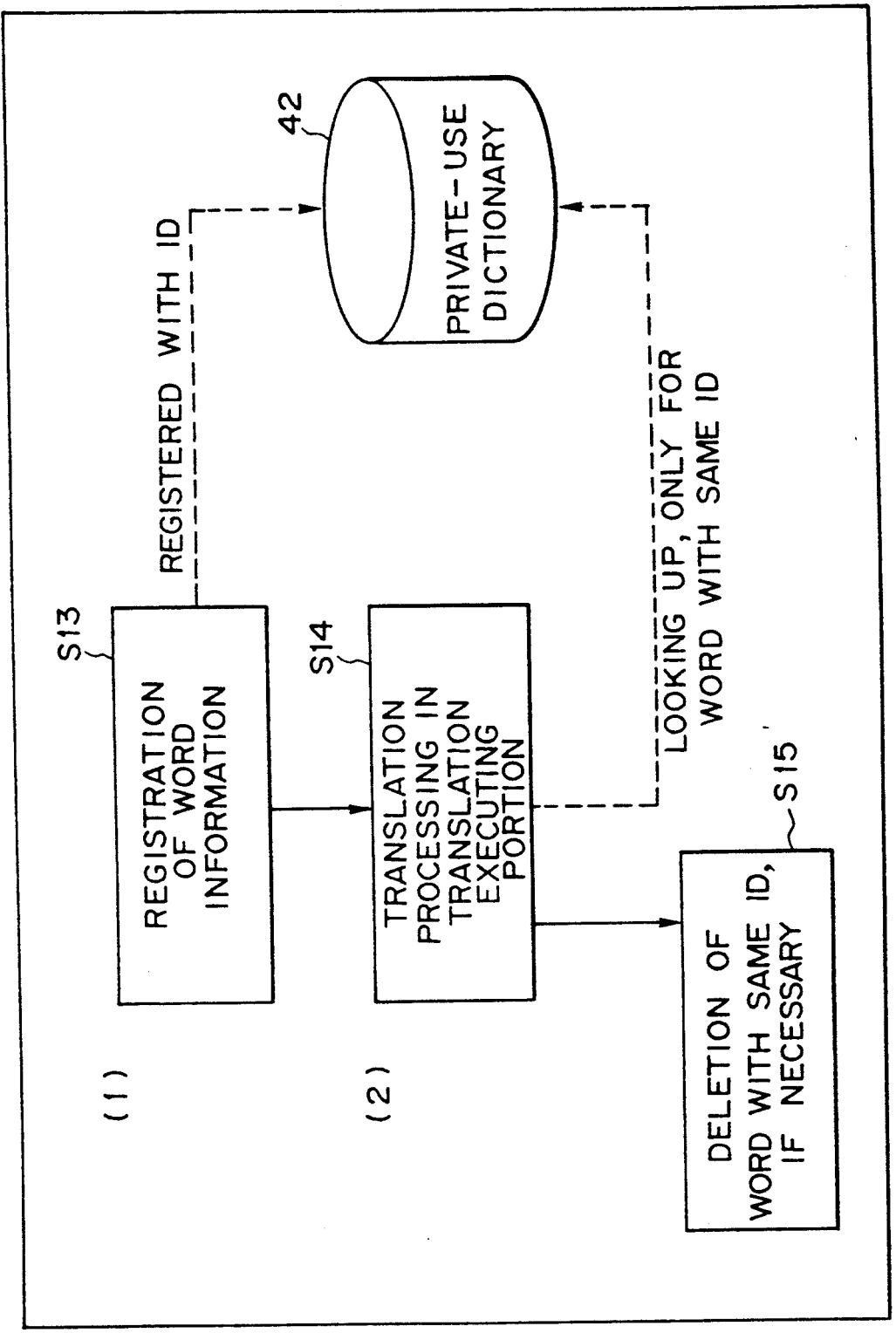
FIGS. 6A and 6C are a block diagram and flowchart of the second practical embodiment of the present invention, respectively.

FIG. 6A is a block diagram of the second of the additional embodiment of the present invention, illustrating a process flow performed by the second type which employs an identifier (ID) of the process or of the user for the private-use word.

In the process shown in FIG. 6A in a step S13 of the process, a private-use word used by the user is registered or temporarily stored in the temporary dictionary according to the contents of the word definition line of the private-use word appearing in the text portion of the electronic mail, to form a private-use word dictionary 41. This dictionary 41 is shared with other users. This second embodiment of the present invention shown in FIGS. 6A and 6B differs from the first embodiment of the present invention shown in FIGS. 5A, 5B in that the identifier (ID) of the process or of the user (hereinafter referred to as the process ID or the user ID) is applied to the private-use word when the private-use word is registered or temporarily stored in the private-use dictionary 41. This identifier (ID) employed in the second embodiment of the present invention is previously determined. Consequently, in the thus formed private-use word dictionary 41 of the second embodiment of the present invention, the registered special word has the process ID or the user ID in addition to the information of the private-use word such as data as to the private-use word in the source language, its corresponding private-use word in the target language, "part of speech" classification of the special word and the like.

Figure 6B:
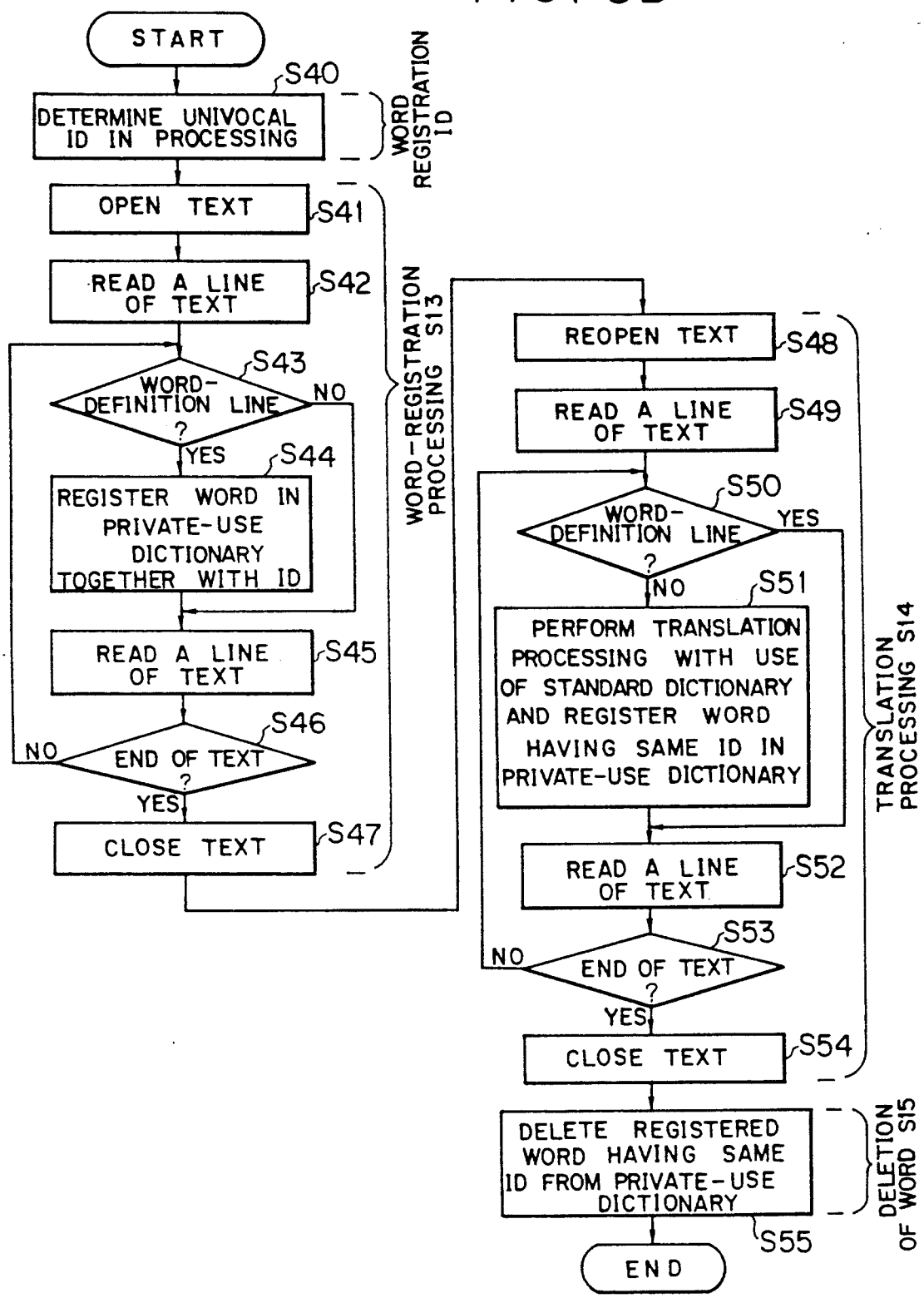
Figure 6C:
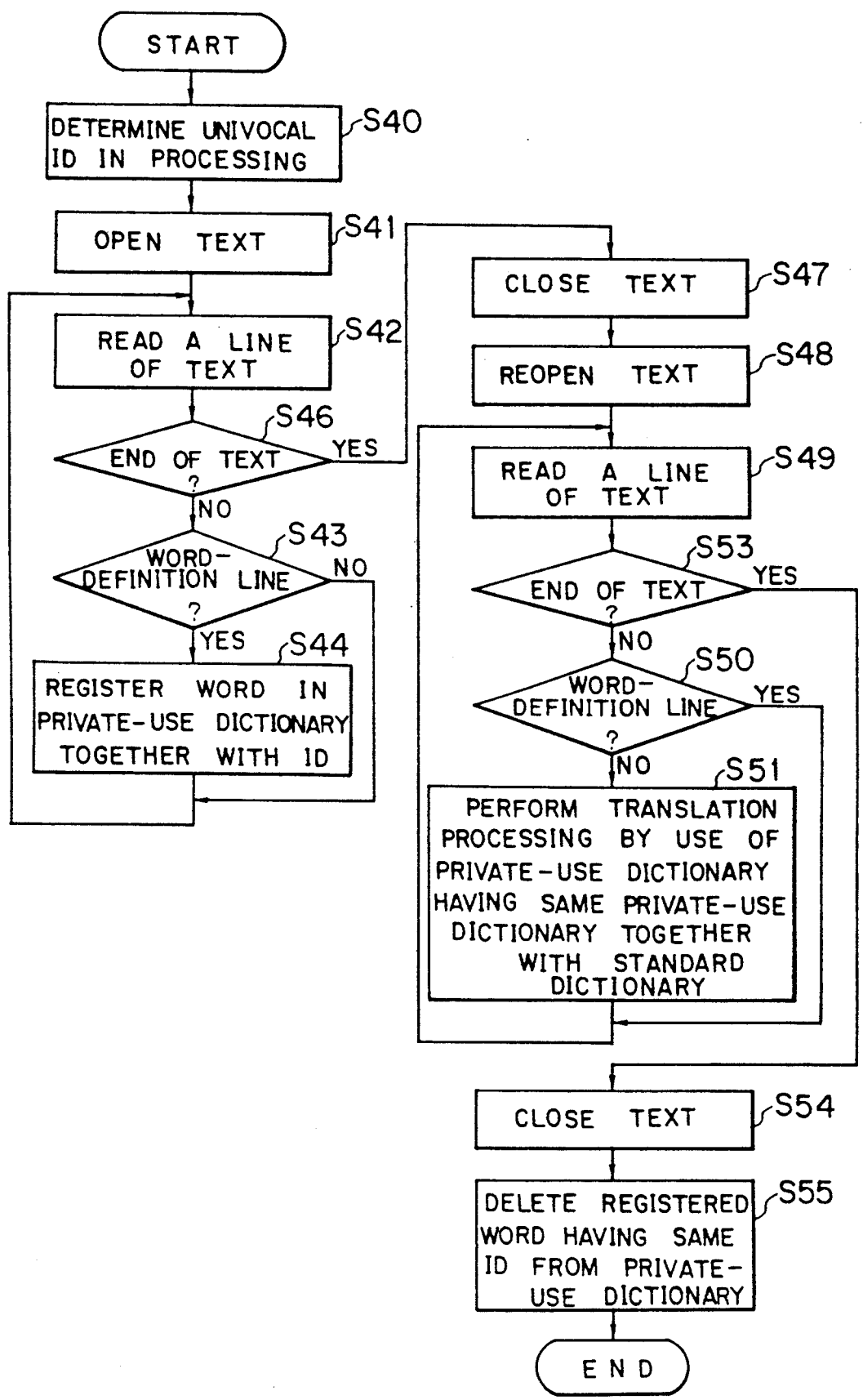

Thus, in a second step S14 of the process shown in FIGS. 6A and 6B, the translation-executing portion 39 of the machine-translation/electronic-mail system 1 shown in FIG. 3 performs the translation process with reference to the private-use word dictionary or temporary dictionary 41. At this time, the process ID or the user ID is used. If the process ID is used in the private-use word dictionary or temporary dictionary 41, the dictionary 41 is looked up to find the private-use word having the same process ID, thereby permitting the private-use word to be properly translated into the target language. The user ID is used in the dictionary 41 and the dictionary 41 is looked up to find the private-use word having the same user ID, thereby permitting the private-use word to be properly translated into the target language.

In this second embodiment of the present invention shown in FIGS. 6A and 6B, the registered special word is not necessarily deleted even after completion of the subject translation process, because there is no possibility that the private-use word will be used in other fields unless the same process ID or the same user ID is designated during a translation process performed in the other fields. However, if the registered private-use word is of a throwaway type, it is deleted from the private-use word dictionary 41 in a step S15 of the process shown in FIGS. 6A and 6B after completion of translation of the text. That is, the registered throwaway-type private-use word having the same process ID or having the same user ID is deleted after completion of translation of the text.

FIG. 6B is a flowchart of the translation process shown in FIG. 6A. This flowchart is now described.

As is clear from the flowchart of the translation process shown in FIG. 6B, an identifier (ID) employed in the process is first determined in a step S40 of the process, and registered in the private-use word dictionary or temporary dictionary 42 shown in FIG. 6A in step S13 shown in FIG. 6A, so that the step S40 is followed by step S41 in which the text in the source language is opened. The step S41 is followed by step S42 in which the first line of the text is read. Thereafter, in a step S43, it is judged whether or not the first line of the text is the word definition line of the private-use word, i.e., whether or not the first line of the text starts with the item ".define", as in the first embodiment of the present invention. If it does, the first line is judged to be the word definition line of the private-use word. If it does not, it is judged to be the object of translation.

If the first line of the text is judged to be the definition statement of the private-use word in the step S43 (YES), in a step S44 of the process, data of the subject private-use word (comprising, for example, the private-use word in the source language, its corresponding private-use word in the target language, "parts of speech" classification of the private-use word, and like data) is registered or temporarily stored in the private-use word dictionary or temporary dictionary 41 together with the identifier (ID). This dictionary 41 is shared by users in the specified field. Thereafter, the following step S45 is performed. If the first line of the text is judged not to be the definition statement of the private-use word in the step S43 (NO), the step S43 is followed by a step S45.

In step S45, the second line of the text is read. It is then judged in a step S46 whether or not the text has lines still not read. If it has lines still not read (NO), the step 46 is followed by the step S43, in which it is judged whether the line having been read is the word definition line of the private-use word or the object of translation. If every line of the text has already been read, i.e., if there is no line to be read in the text (YES), the step S46 is followed by a step S47 in which the text is closed so that the step S13 of the process shown in FIG. 5A is finished.

Then, the second step S14 of the process shown in FIGS. 6A and 6B is performed. More particularly, first of all, in a step S48 of the flowchart shown in FIG. 6B, the text in the source language is opened again so that the step S48 is followed by a step S49 in which the text is read from the first line thereof. The step S49 of the process is then followed by a step S50 in which a line of the text is judged as to whether or not the line is the word definition line of the private-use word. If the line of text is judged not to be the definition statement of the private-use word (NO), the step S50 is followed by a step S51 in which the line of the text in the source language is translated into the target language. In the translation process, the private-use word dictionary or temporary dictionary 42 is first looked up only for the private-use word having the same identifier ID which is determined in the step S40 of the process shown in FIG. 6B, so that the process of translating the text performed. If the private-use word is not found in the private-use word dictionary or temporary dictionary 42, the standard dictionary 7 shown in FIG. 1 is looked up to find the special word.

When the translation process is finished or if the line of the text is judged to be the definition statement of the private-use word (YES) in the step S51, the step 51 is followed by a step S52 in which the line following the text is read so that the step S52 is followed by a step S53 in which the following subject line of the text is judged as to whether or not it is the last line of the text, i.e., as to whether or not there is a line still not read. If there is a line still not read (NO), the step S53 is followed by the step S50 to cycle the above procedure, thereby permitting every line of the text except the definition statement of the private-use word to be translated into the target language. If there is no line still not read (YES), the step S53 is followed by a step S54 in which the text is closed so that the translation-processing step S14 of the process is finished.

Finally, if necessary, a step 55 of the process shown in FIG. 6A is performed to delete the registered private-use word from the private-use word dictionary or temporary dictionary 41. In this case, only a private-use word having the same identifier (ID) is deleted.

In FIG. 6, the end of the text is determined at step S46 before the line is judged to be the word definition line at step S43. Therefore, step S45 for reading a line of the text is unnecessary after the word with ID is registered in the private-use dictionary at step S44. The end of the text is determined at step S53 before the line is judged to be the word definition line at step S50. Thus, it is unnecessary to read a line from the text after the translation is performed by using the word with the same ID stored in the private-use dictionary and the standard dictionary as shown in step S51.

Figure 7A:
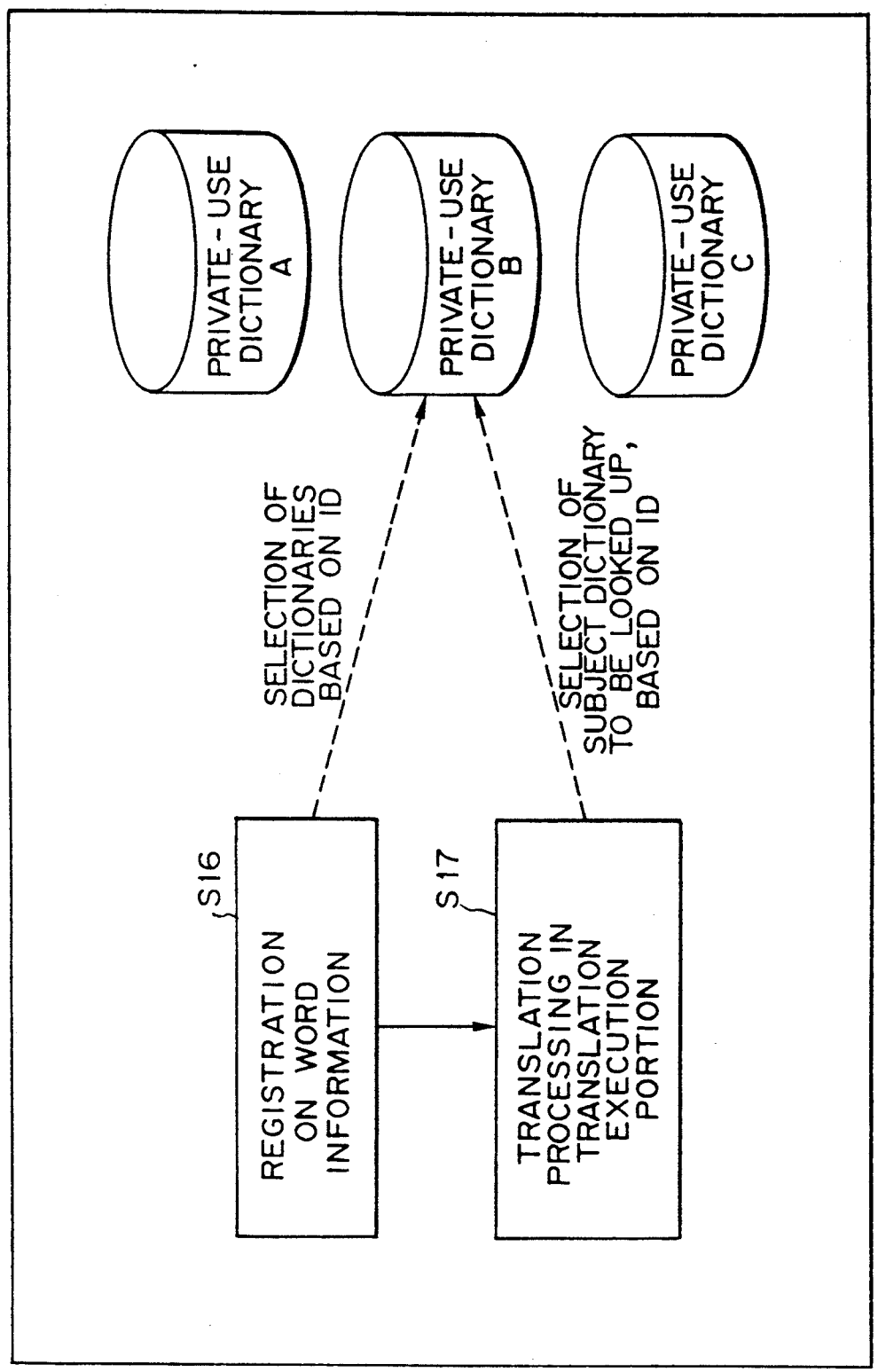
FIGS. 7A and 7C are a block diagram and a flowchart of the third practical embodiment of the present invention, respectively.

FIG. 7A is a block diagram of the third additional embodiment of the present invention. It illustrates a process flow performed by the third embodiment, which employs private-use word dictionaries "A", "B" and "C" each of which is exclusively used for processes or for users in a different fields.

In the process shown in FIG. 6A, first of all, in a step S16 of the process, the private-use word used by the user is registered or temporarily stored in a private-use dictionary according to the contents of the definition statement of the special word appearing in the text portion of the electronic mail, to form a private-use word dictionary "A", "B" or "C". This dictionary is not shared by users in different fields. This third embodiment of the present invention shown in FIGS. 7A and 7B differs from the first embodiment of the present invention shown in FIGS. 5A and 5B in that the identifier (ID) is applied to the private-use dictionary (hereinafter referred to as the dictionary ID) when the private-use word is registered or temporarily stored in a private-use dictionary "A", "B" or "C". The previously prepared dictionary "A", "B" or "C", is selected in the translation process based on this ID. If there is no dictionary designated by the same dictionary ID, a new special-word dictionary is prepared.

Then, in a second step S17 of the process shown in FIGS. 6A and 6B, the translation-executing portion 39 of the machine-translation/electronic-mail system 1 shown in FIG. 3 performs the translation process with reference to the thus selected or newly prepared dictionary "A", "B", "C" or the like. Also, in this third embodiment of the present invention, if necessary, the registered private-use word is deleted from the dictionary "A", "B", "C" or the like after completion of translation of the text.

Figure 7B:
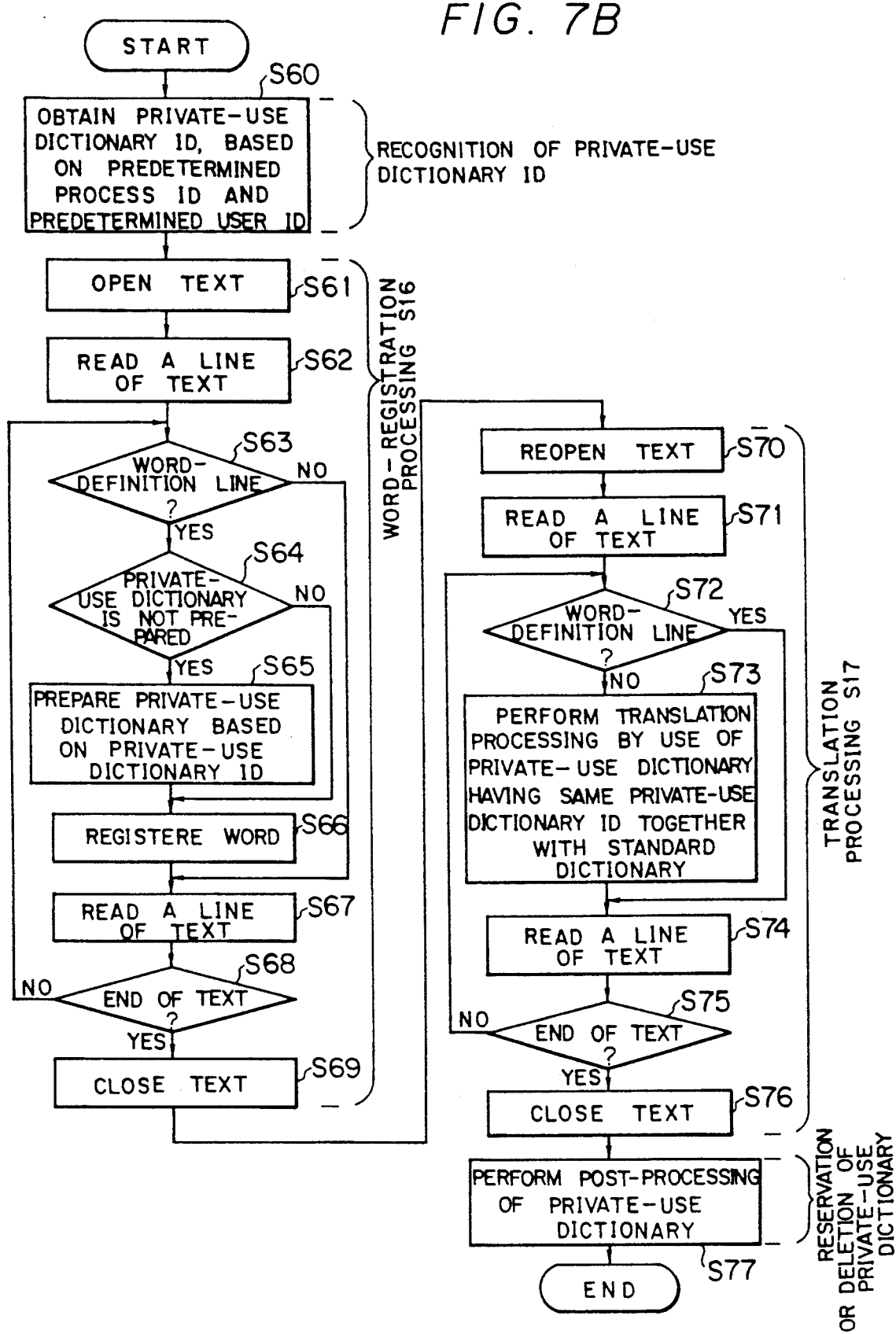

FIG. 7B is a flowchart of the translation process shown in FIG. 7A. This flowchart is now described.

As is clear from the flowchart of the translation process shown in FIG. 7B, the dictionary ID employed in the process is first recognized in a step S60 of the process, thereby permitting one of the private-use word dictionaries or temporary dictionaries "A", "B", or "C" to be selected therefrom when these dictionaries "A", "B", and "C" have already been prepared.

Then, the word-registering process specified in the first step S16 is performed. Next, as is clear from the flowchart shown in FIG. 7B, the step S60 is followed by a step S61 in which the text in the source language is opened. The step S61 is followed by a step S62 in which the first line of the text is read. Thereafter, in a step S63, it is judged whether or not the first line of the text is the word-definition line of the special word, i.e., whether or not the first line of the text starts with the item ".define", as in the first embodiment of the present invention. If it does, it is judged to be the word-definition line of the private-use word (YES) in a step S63, so the step S63 is followed by a step S64 in which it is judged whether or not the dictionaries "A", "B", "C" are already stored in the machine-translation/electronic-mail system 1 shown in FIG. 1. If the dictionaries "A", "B" and "C" are not stored in the system 1, i.e., the special-word dictionary is still not be prepared, the fifth step S64 is followed by a step S65 in which the special-word dictionary is newly prepared. After completion of preparation of the dictionary, or if the dictionaries "A", "B" and "C" are already stored in the system 1 (NO in the step S64), the step 64 is followed by a step 66 in which the special word is registered in the selected dictionary "A", "B", "C" or the above newly prepared dictionary.

After registration of the private-use word in the selected dictionary, or if the line of text is not the definition statement of the special word (NO in the step S63), the step S63 is followed by a step S67 in which the following line of text is read. Then, the step S67 is followed by a step S68 in which it is judged whether or not there is a line still not read in the text. If there is a line still not read (NO), the step S68 is followed by the step 63, thereby permitting the word-registering process ranging from the step S63 to the step S66 to be cycled. If there is no line still not read in (YES), the step S68 is followed by a step S69 in which the text is closed so that the word-registering step or process S16 is finished.

After completion of the word-registering process S16 in the flowchart shown in FIG. 7B, the step S17 shown in FIGS. 7A and 7B is performed. More particularly, first of all, in the step S70 of the flowchart shown in FIG. 7B, the text in the source language is opened again so that the step S70 is followed by a step S71 in which the text is read from the first line thereof. The step S71 of the process is then followed by a step S72 in which every line of the text is judged as to whether or not the line is the word-definition line of the private-use word. If it is not (NO), the step S72 is followed by a step S73 in which the line of the text in the source language is translated into the target language. In the translation process, the selected one of the private-use word dictionaries "A", "B", "C" or the newly prepared dictionary is looked up together with the standard dictionary 7 shown in FIG. 1. The dictionary is selected based on the same dictionary ID.

When the translation process is finished or if the line of the text is judged to be the definition statement of the special word (YES in the step S72), the step S72 is followed by a step S74 in which the line following the text is read. Thus, the step S74 is followed by a step S75 in which the subject following the line of the text is judged as to whether or not it is the last line of the text, i.e., whether or not there is a line still not read in the text. If there is a line still not read in (NO), the step S75 is followed by the step S72 to cycle the above procedure from the step S72 to the step S75, thereby permitting every line of the text except the word-definition line of the private-use word to be translated into the target language. If there is no line still not read (YES in the step S 75), the step S75 is followed by a step S76 in which the text is closed so that the translation-processing step or process S17 is finished.

Finally, in a step S77, a post-processing procedure is performed on each of the thus prepared special-word dictionaries "A", "B", "C" and the like, i.e., these dictionaries are reserved in or deleted from the system 1 shown in FIG. 1.

Figure 7C:
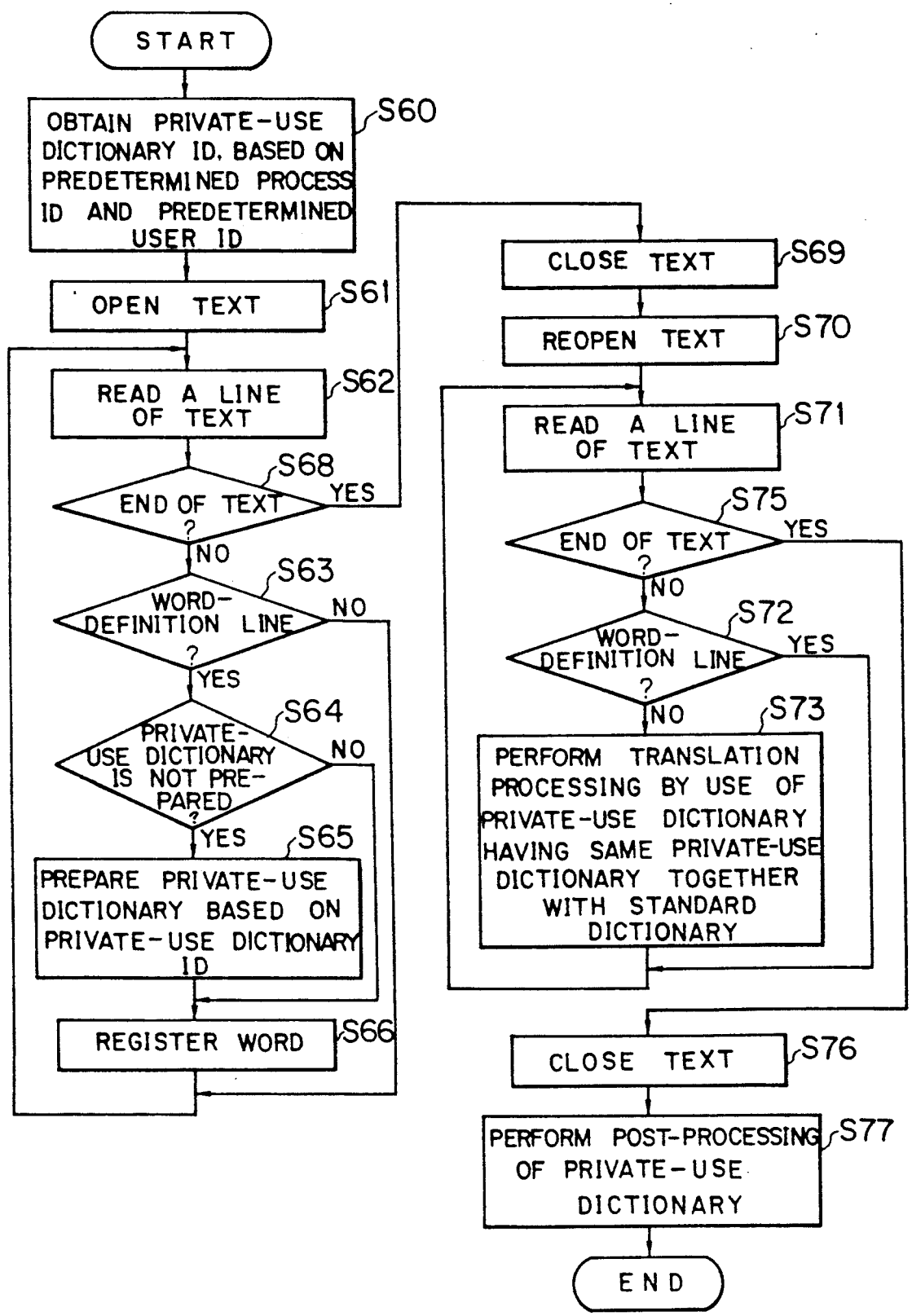

FIG. 7C shows a modified version of the flowchart shown in FIG. 7B. Like steps in FIG. 7B and 7C are designated by like reference numbers. In FIG. 7C, the determination of the end of the text is performed at step S68 before the line is determined to be the word definition line at step S63. Therefore, step S67 for reading a line of the text shown in FIG. 7B is unnecessary in FIG. 7C. The determination of the end of the text is performed at step S75 upon performance of the translation before the line is determined to be the word definition line at step S72. Thus, it is also unnecessary to read to perform step S74 shown in FIG. 7B.

Figure 8A:
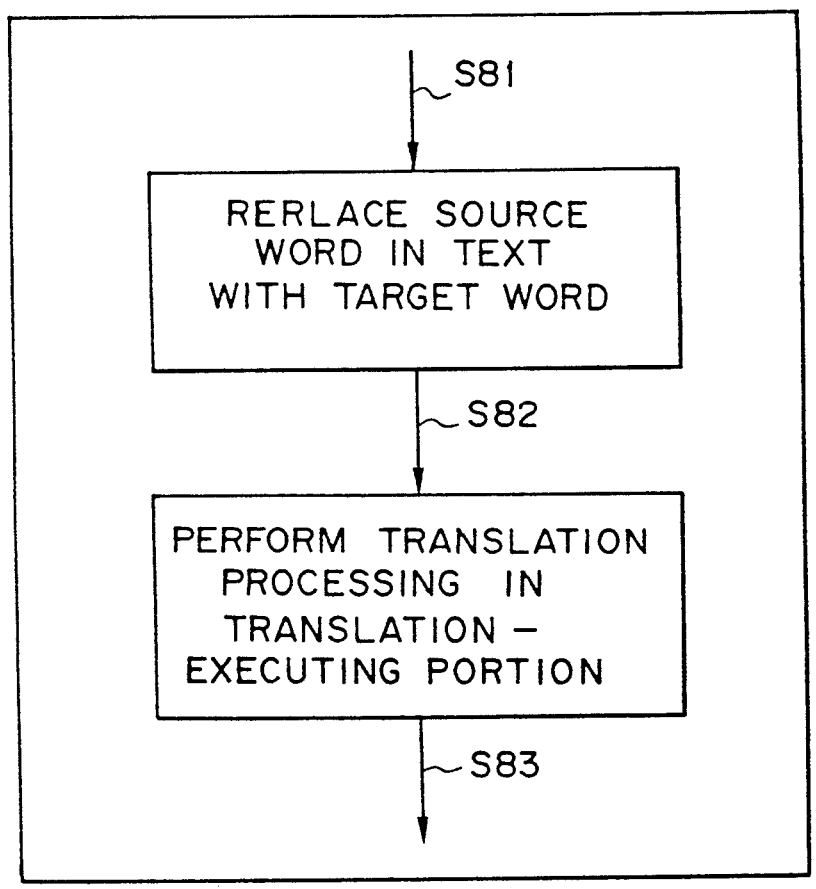

FIG. 8A is a block diagram illustrating a process flow of another embodiment of the present invention, which has substantially the same construction as the first embodiment of the present invention shown in FIG. 3. In the another embodiment of the present invention shown in 8A, as in the first embodiment shown in FIG. 3, the translation process is first performed in the word-definition recognition portion 37. However, after that, in contrast with the process performed in the first embodiment of the present invention, the embodiment of the present invention does not perform the translation process in the temporarily-registering portion 38 shown in FIG. 3. That is, in the other embodiment of the present invention shown in FIG. 8A, the special-word dictionary for registering or temporarily storing the private-use word is not prepared and a proper pre-processing of the electronic mail containing the text is performed according to the word definition line appearing in the document of the electronic mail so that the subject private-use word appearing in the object of translation is replaced with its corresponding private-use word in the target language. If the private-use word in the source language is a new technological term (noun), since it is suffice to simply replace the private-use word in the source language with its corresponding special word in the target language, the other embodiment of the present invention shown in FIGS. 8A and 8B is effective.

FIG. 8A shows schematically the architecture of the other embodiment of the present invention.

In the translation process performed in the other embodiment of the present invention shown in FIGS. 8A and 8B, first of all, the electronic mail delivered from the user is received in the electronic-mail receiving portion 36 (shown in FIG. 3). Here, the electronic mail is divided into header portion and text portion and is issued to the word-definition recognition portion 37 (shown in FIG. 3) in which the definition statement of the special word is found in the text portion. Thus, necessary information of the special word such as data as to the source language, the target language, date of mail and the like is extracted from the text portion of the electronic mail in a first step S81 of the process shown in FIGS. 8A and 8B. Thus, the object of translation or source text is selected to make it possible for the special word in the source language to be found. The special word is then replaced with its corresponding special word in the target language in a second step S82 following the first step S81. In a third step S83 following the second step S82, the thus prepared source text having the special word in the source language therein replaced with the corresponding special word in the target language is then subjected to a final stage of the translation process performed in the translation-executing portion 39 (shown in FIG. 3). Thus, the translation result is obtained in the third step S83 and is then issued to the electronic-mail transmitting portion 40 (shown in FIG. 3) through which the electronic mail is delivered to each of the designated users in the subject field.

FIG. 8B is a detailed block diagram illustrating the process flow in the embodiment shown in FIG. 8A.

First of all, the details or contents of an output issued from the word-definition recognition portion 37 of the machine-translation/electronic-mail system 1 are illustrated in an item (1) in FIG. 8B. This output is then issued in the first step S81. In the translation process performed in the embodiment shown in FIG. 8A, as shown in FIG. 8B, the following private-use word is found in the object of translation or text portion of the electronic mail:

" ソースプログラム "

which is the Japanese word to be replaced with the English word "source program".

As a result, the output issued from the second step S82 of the translation process assumes a form illustrated in an item (2) of FIG. 8B. This output is supplied to the translation-executing portion 39 of the machine-translation/electronic-mail system 1 (shown in FIG. 3), so that the remaining part of the text portion still not translated into the target language, i.e., the text portion except the word "source program" is translated into the target language, which is English in this case, whereby a proper translation result as shown in item (3) of FIG. 8B is produced.

In accordance with the present invention, it is possible for users in different fields to specify private-use words in the source language by the use of a customized proper private-use word dictionary to be translated into a specified meaning in the target language even in the machine-translation/electronic-mail system. In addition, the present invention is effective against texts or documents containing a large number of new technological terms and new product names in obtaining a proper translation of the texts. This is ensured by the use of the customized proper dictionary.

What is claimed is:

1. In a machine-translation electronic-mail system having an electronic-mail receiving unit, an electronic-mail transmitting unit and a standard dictionary used in a machine translation process, the improvement comprising the machine-translation electronic-mail system being a private-use-word registering apparatus, comprising:

word-definition recognition means for recognizing a word-definition command for defining a private-use word used by a specific user, and extracting a particular word to be registered as said private-use word, said word-definition command existing in an electronic mail containing a document comprising said particular word to be translated, said electronic mail being produced by said specified user and being received by said electronic-mail receiving unit;

temporarily-registering means for temporarily storing in a private-use word dictionary said private-use word having been extracted by said word-definition recognition means, said private-use word dictionary being temporarily used in the translation as the private-use word dictionary; and translation means for performing the translation by using said private-use-word dictionary having private-use words registered in it by said temporarily-registering means together with said standard dictionary, to obtain a translation result which is issued to said electronic-mail transmitting unit from which said translation result is delivered to designated users through said electronic mail.

2. The private-use word registering apparatus as set forth in claim 1, wherein
said temporarily-registering means registers said private-use word in said private-use word dictionary before the translation process is performed, said private-use word dictionary being shared with users in the translation, said private-use word having been registered being deleted by said temporarily-registering means after completion of the translation.

3. The private-use word registering apparatus as set forth in claim 1, wherein
said temporarily-registering means for registering said private-use word in said private-use word dictionary together with its identifier (ID) before the translation is performed, said private-use word dictionary being shared with users in the translation, said private-use word having been registered being deleted by said temporarily-registering means after completion of the translation.

4. The private-use word registering apparatus as set forth in claim 1, wherein
said translation means for performing the translation process with reference to said private-use word having been registered in said private-use word dictionary by said temporarily-registering means, provided that said private-use word carries a private-use identifier (ID).

5. The private-use word registering apparatus as set forth in claim 1, wherein
said temporarily-registering means for registering said private-use word in said private-use word dictionary together with its user identifier (ID) before the translation is performed, said private-use word dictionary being shared with users in the translation, said private-use word having been registered being deleted by said temporarily-registering means after completion of the translation.

6. The private-use word registering apparatus as set forth in claim 1, wherein
said translation means for performing the translation with reference to said private-use word having been registered in said private-use word dictionary by said word temporarily-registering means, provided that said private-use word carries a user identified (ID).

7. The private-use word registering apparatus as set forth in claim 1, wherein
said temporarily-registering means generates a private-use word dictionary every translation process.

8. The private-use word registering apparatus as set forth in claim 1, wherein
said translation means for performing the translation process with reference to said private-use word dictionary being generated by said temporarily-registering means in the translation process.

9. The private-use word registering apparatus as set forth in claim 1, wherein
said temporarily-registering means generates a private-use word dictionary for each user in translation.

10. The private-use word registering apparatus as set forth in claim 1, wherein said translation means for performing the translation with reference to said private-use word dictionary being generated by said temporarily-registering means while being used by said specified user.

11. The private-use word registering apparatus as set forth in claim 1, wherein
said temporarily-registering means extracts said private-use word from said document, said private-use word being extracted by said word-definition recognition means, and replaces the private-use word with a translated private-use word before the translation process is performed.

12. The private-use word registering apparatus as set forth in claim 1, wherein
both said electronic mail transmitting unit and said electronic mail receiving unit are operated for said specified user.

* * * * *